United States Patent [19]
Nemoto et al.

[11] Patent Number: 5,558,951
[45] Date of Patent: Sep. 24, 1996

[54] DUST-PROOF DEVICE FOR SKIRT PORTION OF SEAM-TYPE BELLOWS

[76] Inventors: Takeshi Nemoto; Teruko Nemoto, both of 4-32, Johmyoji 1-chome, Kamakura 248, Japan

[21] Appl. No.: 353,829

[22] Filed: Dec. 12, 1994

[30] Foreign Application Priority Data

Jan. 7, 1994 [JP] Japan .................... 6-012120

[51] Int. Cl.⁶ .................................................. G12B 1/04
[52] U.S. Cl. .......................... 428/102; 428/192; 428/193; 493/940; 29/454
[58] Field of Search ....................... 428/102, 192, 428/193; 493/940; 29/454

[56] References Cited

U.S. PATENT DOCUMENTS

| | | | |
|---|---|---|---|
| 4,051,522 | 9/1977 | Healey et al. | 128/903 |
| 4,428,381 | 1/1984 | Hepp | 128/904 |
| 4,731,051 | 3/1988 | Fischell | 604/67 |
| 4,974,607 | 12/1990 | Miwa | 128/903 |
| 5,159,928 | 11/1992 | Keppel | 128/905 |
| 5,205,294 | 4/1993 | Flach et al. | 128/903 |
| 5,220,919 | 6/1993 | Phillips et al. | 128/903 |
| 5,279,556 | 1/1994 | Goi et al. | 604/67 |
| 5,316,819 | 5/1994 | Nemoto et al. | 428/102 |
| 5,319,355 | 6/1994 | Russek | 128/903 |
| 5,322,069 | 6/1994 | Gailant et al. | 128/900 |
| 5,328,460 | 7/1994 | Lord et al. | 604/67 |

*Primary Examiner*—Alexander S. Thomas
*Attorney, Agent, or Firm*—Trexler, Bushnell, Giangiorgi & Blackstone, Ltd.

[57] ABSTRACT

A three-side covering seam-type bellows includes a plurality of essentially C-shaped sheets of mutually identical configuration, the sheets being piled to each other for forming the bellows. The bellows has a pair of obliquely extending lower edges provided for each of the sheets. An outer sewing line extends along the outer peripheral edge of each of the sheets, the outer sewing line extending to the inner end of the obliquely extending lower edges, and an inner sewing line extends along the inner peripheral edge of each of the sheets, the inner sewing line being terminated at terminating points on the inner peripheral edges extending from the inner end of the obliquely extending edge and spaced apart from the inner end. A pair of unsewn portions are formed between the inner ends and the termination points.

3 Claims, 3 Drawing Sheets

5,558,951

1

DUST-PROOF DEVICE FOR SKIRT PORTION OF SEAM-TYPE BELLOWS

BACKGROUND OF THE INVENTION

1. Field of the Invention

The present invention relates generally to an expandable cover for protecting an expandable portion and/or articulated portion of machines or so forth from foreign disturbances, such as dust, light beam, moisture and so forth, particularly to a bellows. More specifically, the invention relates to a dust-proof device for a skirt portion of a seam-type bellows of the type which surrounds the expandable portion and/or articulated portion of the machines to be protected except for one side, typically the bottom.

2. Description of the Related Art

Conventionally, one-side opened seam-type bellows, typically a bottom opened seam type bellows is produced by cutting a material sheet which is produced by coating a neoprene rubber on a cloth, into an essentially rectangular configuration with both side extensions, as shown in FIG. 1 to form a plurality of C-shaped sheet 1;, overlying each two C-shaped sheets and sewing respective inner edges 2 and 3, 3 by a yarn 4, which will be hereinafter referred to as "inside sewing"; overlying the sewn pairs of the C-shaped sheets and sewing outer edges 5 and 6, 6 by a yarn 7, which will be hereinafter referred to as "outside sewing". By alternative inside sewing and outside sewing, a plurality of the C-shaped sheets 1 are connected with adjacent sheets in zigzag fashion to form one bellows, as shown in FIG. 3. As can be seen from FIG. 3, tip end edges 8, 8 of the both side extensions are left unsewn, which will be hereinafter referred to as "unsewn portion". The unsewn portions 8, 8 permit expanding and contracting deformation of the bellows by opening and closing deformation of the unsewn portions.

In the conventional one-side opened bellows constructed as set forth above, the outer edges and skirt portions 6, 6 of respective C-shaped sheets 1, 1 ... repeat motion to displace inwardly in unison about their upper ends when the bellows expands (see solid line in FIG. 2) and to return to the original shape (see broken line in FIG. 2) when the bellows contracts. A displacement angle of each side edge 6, is shown as $\alpha$ in FIG. 2. The inward displacement angle $\alpha$ is caused by special coupling structure of the one-side opened bellows with the unsewn portions 8, 8.

The special coupling structure of the unsewn portions 8, 8 of respective C-shaped sheets 1, 1 ... is as follow. Namely, the skirt portions of both outer edges 6, 6 of each C-shaped sheet 1, 1 ... are positioned adjacent the unsewn portions 8, 8. The tip end of these unsewn portions 8, 8 are held horizontal at no load condition on the bellows, in which the bellows is contracted at the maximum contraction magnitude. Also, the outer end of the skirt portion is the terminating end of the outside sewing to mate with the outer end of the adjacent sheet at one side. On the other hand, the inner end of the skirt portion is the terminating end of the inside sewing to mate with the inner end of the adjacent sheet at the other side. Therefore, as shown in FIG. 3, according to expansion of the bellows, each of the unsewn portions 8, 8 is subject to tension force in mutually opposite directions at the outer end coupling portion and the inner end coupling portion, to open in zigzag fashion. Such contraction in the widthwise direction of each unsewn portion associated with the opening in the zigzag fashion is distributed as the inward displacement angle $\alpha$ of the outer edges 6, 6 of the C-shaped sheets.

It should be noted that to the skirt portion of both inner edges 3, 3 of the C-shaped sheets, outward tension force generated associating with the opening of the outer end coupling portion is exerted. Therefore, the inward displacement angle at the inner edges 3, 3 becomes smaller than the inward displacement angle $\alpha$ of the outer edges 6, 6 in the extent corresponding to the outward tension force. Even though the displacement angle is reduced in the certain magnitude at the inner edge as set forth above, the inward displacement of the inner edges 3, 3 inherently causes narrowing of the internal space of the bellows to possibly cause interference with a member to be covered(not shown). As a solution for this, the bellows is normally formed to be greater than the member to be covered so that the inward displacement of the inner edges 3, 3 may be accommodated without causing interference between the bellows and the member to be covered.

As set forth above, in the conventional one-side opened seam-type bellows, the unsewn portions 8, 8 of the C-shaped sheets are subject tensions in mutually opposite directions at the outer end coupling portion and the inner end coupling portion to open in the zigzag fashion. At the same time, due to reduction in width at the unsewn E portion due to opening at the coupling portion, both outer edges 6, 6 of the C-shaped sheet are displaced inwardly. The inward displacement motion of the inner and outer edge portions may serve as fan action. Simultaneous occurrence of such fan action and opening of the unsewn portion in the zigzag fashion should cause drawing force to introduce dust, water vapor, oil vapor and so forth floating around the bellows into the interior space of the bellows.

On the other hand, as set forth above, although the displacement magnitude at the inner edge 3, 3 is reduced due to outward tension force, as shown in FIG. 2 inward displacement at the unsewn portions is inherently caused to increase possibility of causing interference with the member to be covered. Therefore, in order to avoid the possibility of causing interference between the bellows and the member to be covered, the interior space of the bellows is formed to be greater than that required for covering the member so as to accommodate the inward displacement of the unsewn portion.

SUMMARY OF THE INVENTION

In view of the drawbacks in the prior art as set out above, it is the first object of the present invention to provide a dust-proofing device for a bellows, which reduces magnitude of inward displacement of the skirt portions of the outer edge to suppress fan action, closes the lower portion of the bellows in zigzag configuration for preventing dust or other debris from entering into the interior space of the bellows through the skirt portion.

A second object of the invention is to provide a bellows which can reduce magnitude of inward displacement of the bellows during expansion or eliminate inward displacement to permit down-sizing of the bellows.

A third object of the invention is to provide a bellows which can reduce outward displacement of the bellows to permit down-sizing of the bellows.

In order to accomplish the above-mentioned and other objects, a three-side covering, seam-type bellows comprises:

a plurality of essentially C-shaped sheets of mutually identical configuration, the sheets being adjacently adjoined for forming the bellows;

a pair of obliquely extending lower edges provided for each of the sheets;

an outer sewing line extending along the outer peripheral edge of each of the sheets, the outer sewing line extending to the inner end of the obliquely extending lower edges;

an inner sewing line extending along the inner peripheral edge of each of the sheets, the inner sewing line being terminated at terminating points on the inner peripheral edges extending from the inner end of the obliquely extending edge and spaced apart from the inner end; and a pair of unsewn portions formed between the inner ends and the termination points.

Preferably, the three-side covering seam-type bellows is formed cut-outs along portions of the inner end corresponding to the unsewn portions. In this case, each of the sheets may have a horizontally extending upper portion and a pair of vertically extending side portions extending downwardly from both ends of the upper portion, and arcuate edge is disposed between outer edges of the upper portion and each of the side portions.

According to another aspect of the invention, a bellows comprises:

a plurality of shaped sheets having an essentially rectangular major portion extending in substantially horizontal direction and having outer and inner horizontally extending edges, and vertically extending portions extending downwardly from both ends of the major portions and respectively having outer and inner vertically extending edges at no-load condition, the vertically extending portions further having bottom edges ascending from the inner ends to the outer ends;

an outer sewing line extending along respective of the outer edges for coupling outer edges of adjacent pair of shaped sheets, the outer sewing line further extending along the bottom edges of the vertically extending portions and terminated at the inner end;

an inner sewing line extending along the inner horizontally extending edge and the inner vertically extending edges for coupling inner edges of adjacent pair of shaped sheets paired at the opposite side to the pair of shaped sheets coupled at the outer edges, the inner sewing line being terminated at termination points on the lines extending along the inner vertically extending edges and positioned spaced apart from the inner ends of the bottom edges for leaving unsewn portions along the inner vertically extending edges between the inner ends of the bottom edge and the terminating points.

In the preferred construction, the ascending angle of the bottom edge is selected to maintaining the bottom edge in contact with a base plane on which the bellows is mounted at a position in the vicinity of the inner end in dust-proofing fashion. The bellows may have cut outs along the inner vertically extending edges at portions corresponding the unsewn portions. The outer horizontally extending edge and the outer vertically extending edges may be connected through a chamfered corner therebetween. The chamber is preferable in arc-shaped configuration.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiments of a three-side covering, seam-type bellows according to the present invention will be discussed hereinafter in detail with reference to the accompanying drawings.

Figure 1:
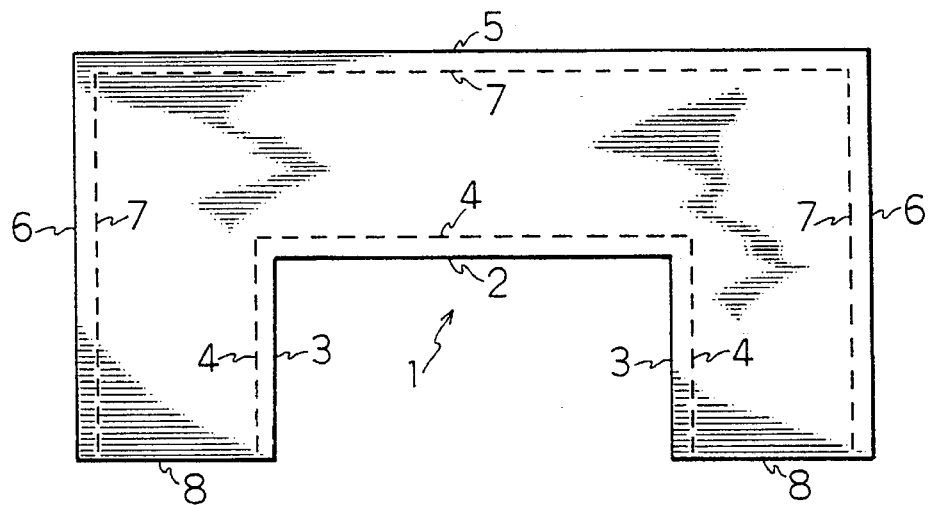
FIG. 1 is a front elevation of a conventionally known three side covering seam-type bellows in no-load condition.
Figure 2:
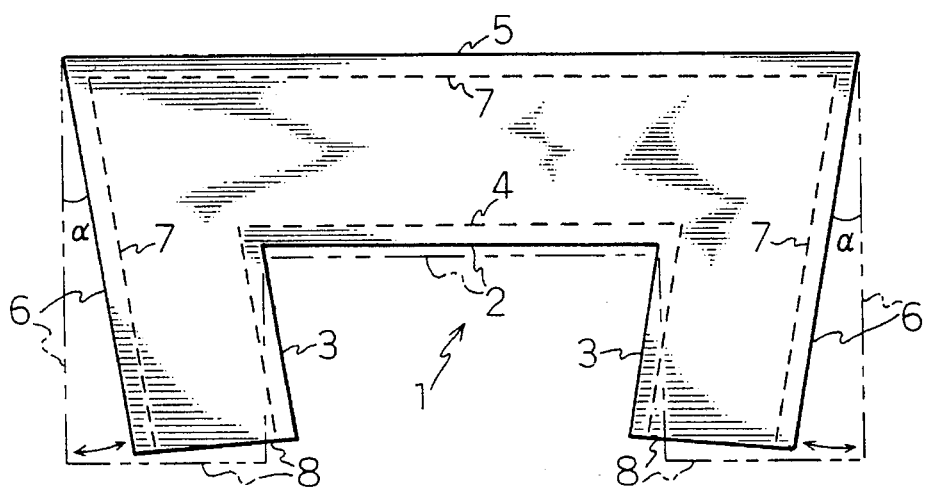
FIG. 2 is a front elevation similar to FIG. 1 but showing the bellows in expanded condition.
Figure 3:
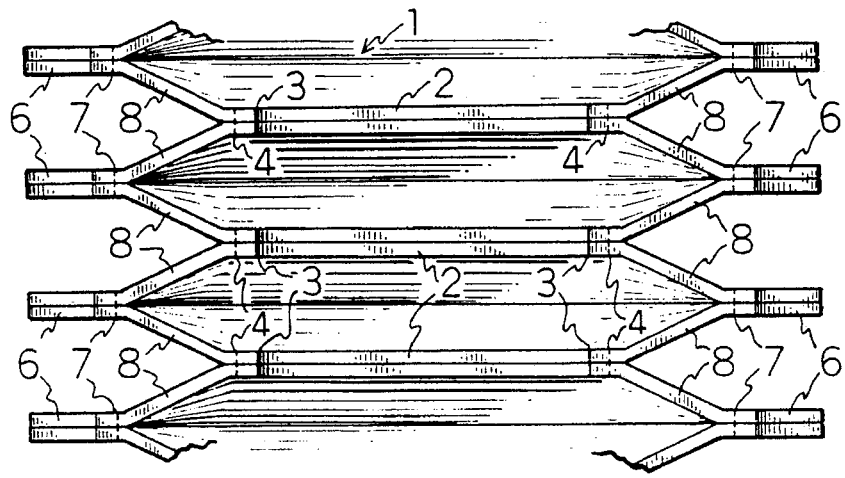
FIG. 3 is a partial bottom plan view of the portion of the conventional bellows situated in the condition of FIG. 1, in which the thickness of each shaped sheet is illustrated thicker than actual proportion for facilitating clear understanding.
Figure 4:
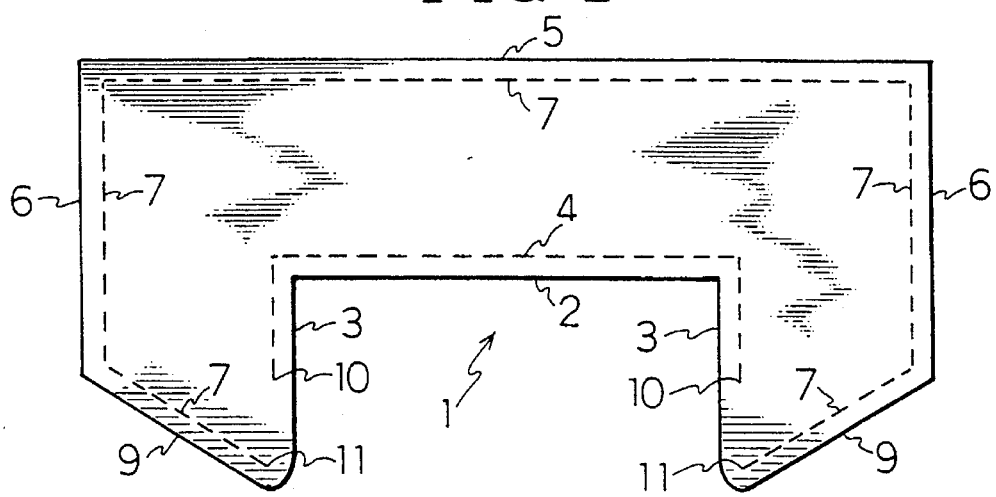
FIG. 4 is a front elevation of the first embodiment of a three-side covering, seam-type bellows according to the present invention, in no-load condition.
Figure 5:
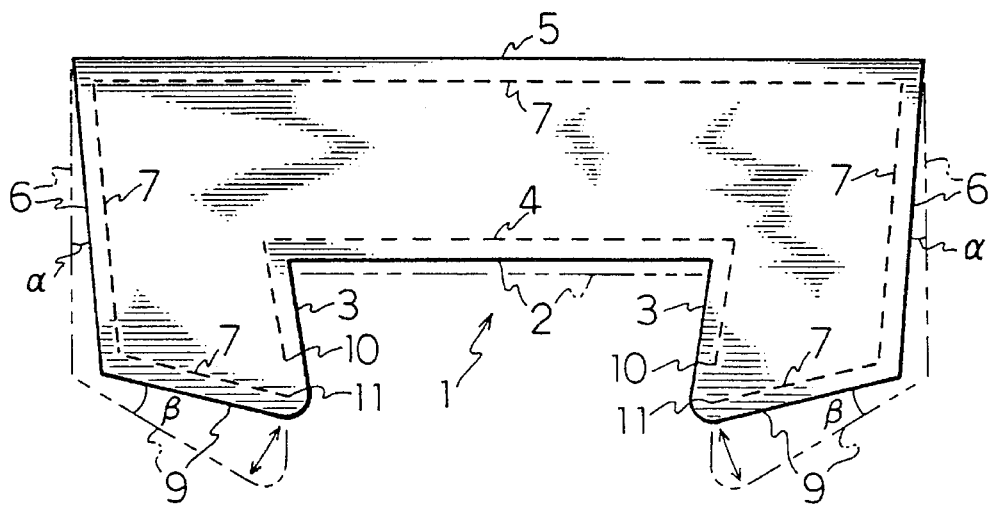
FIG. 5 is a front elevation similar to FIG. 4, but the first embodiment of the bellows is illustrated in the expanded condition.
Figure 6:
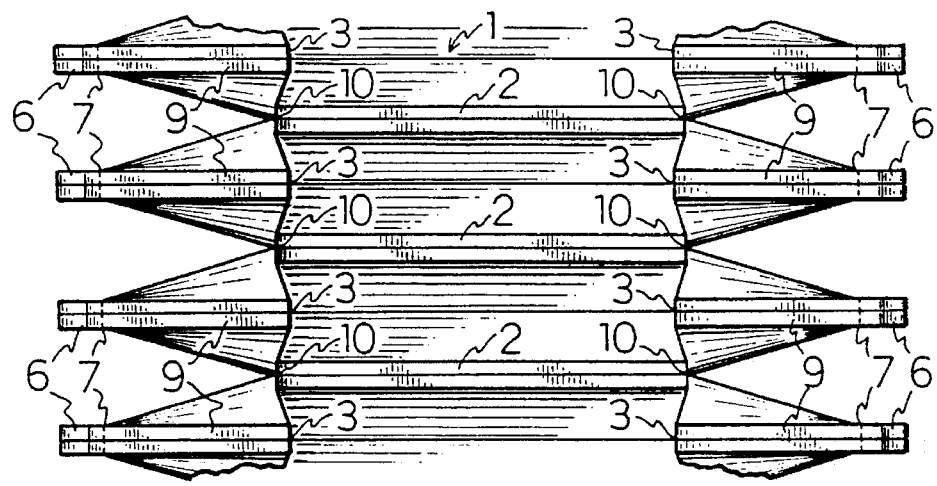
FIG. 6 is a partial bottom plan view of the first embodiment of the bellows, in which the thickness of each shaped sheet is illustrated thicker than actual proportion for facilitating clear understanding.

FIGS. 4, 5 and 6 shows the first embodiment of the three-side covering, seam-type bellows according to the present invention. FIG. 4 is a front elevation of the first embodiment of the bellows in no-load condition, and FIG. 5 is a front elevation of the bellows in expanded and thus loaded condition. FIG. 6 is a bottom plan view of the bellows situated in the condition of FIG. 5. It should be noted that in the following description of the preferred embodiments of the three-side covering, seam-type bellows according to the present invention, the reference numerals common to FIGS. 1, 2 and 3 identify the common or similar elements.

As in the conventional bellows, the shown embodiment of the bellows is formed from a material sheet which is produced by coating a neoprene rubber on a cloth or coating a rubber on a nylon core. The material sheet is punched or cut into a plurality of shaped sheets essentially C-or channel-shaped configuration with an essentially rectangular major portion and both side extensions extending substantially perpendicular to the major portion. As can be seen from FIGS. 4 and 5, free end edges 9, 9 of the both side extensions extend oblique to both side edges 3, 3 and 6, 6 to ascend from the inner ends to the outer ends.

Each pair of shaped sheets 1 are adjoined and sewn along an inner sewing line by a yarn 4. As can be seen, the inner sewing line extends along a lower edge 2 of the major part and is extended along the inner edges 3 up to mid-points 10 of the extensions. The sewn pairs of the shaped sheets are adjoined. Then, respective one of the pairs of the shaped sheets 1 is sewn with mating one of the shaped sheet of the adjacent pair along an outer sewing line by a yarn 7. As can be seen from FIGS. 4 and 5, the outer sewing line extends along an outer edge 5 of the major portion and is further extended along the entire length of the outer side edges 6, 6 and the oblique free end edges 9, 9. Thus, by alternately providing the inner seam and the outer seam, a plurality of shaped sheets are connected in zigzag fashion to form the bellows.

In the shown embodiment, the bellows has unsewn portions along the inner edges 3, 3 at the positions between inner end portions 11, 11 of the oblique free end edges 9, 9 and the mid-points 10, 10.

Since the first embodiment of the bellows is constructed as set forth above, when the bellows is expanded, the unsewn portions opens in vertical direction at the inside of the bellows. By the opening action of the unsewn portions, the inner end portions 11, 11 of the oblique free end edges 9, 9 from the positions at the no-load condition (see two-dotted line in FIG. 5) to the upper positions (see solid line in FIG. 5) with a displacement angle β. Furthermore, by the pulling up action of the inner end portion 11, 11 of the oblique free end edges 9, 9, the skirt portion of the outer edges 6, 6 of the shaped sheet is displaced inwardly from the position at the no-load condition (see two-dotted line of FIG. 5) to the inwardly displaced position (see solid line in FIG. 5) with a displacement angle α.

Here, there are two important features of the shown embodiment. That is, at first, according to the first embodiment of the bellows, since the unsewn portions are opened in the vertical direction at the inside of the bellows, the bottom portion corresponding to the horizontal opened portion (see FIG. 3) is covered by the deformed positions of the oblique free end edges 9, 9 respectively (see FIG. 6).

Secondly, according to the shown embodiment, upon expansion of the bellows, the displacement is primarily caused in the pulled up displacement angle β of the inner end portions 11, 11 of the oblique free end edges 9, 9. Therefore, the displacement angle a is reduced in the extent substantially corresponding to the pulling up displacement angle β so that the displacement angle α can be held substantially small (see FIG. 5).

Figure 7:
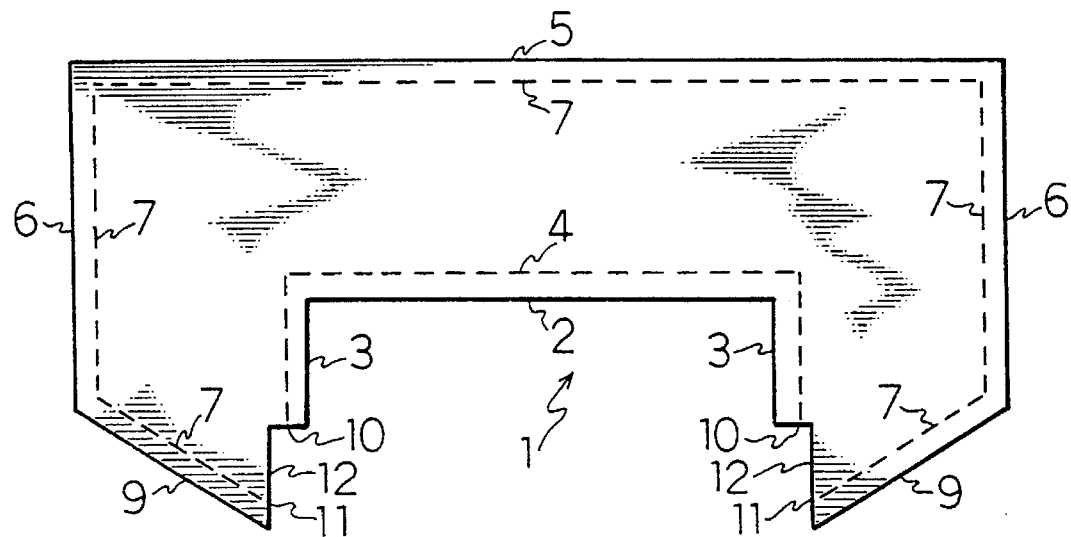
FIG. 7 is a front elevation of the second embodiment of a three-side covering, seam-type bellows according to the present invention, in no-load condition.

FIG. 7 is a front elevation of the second embodiment of the bellows, illustrated in the no-load condition. The second embodiment of the bellows is provided with cut-outs 12, 12 at the position corresponding to the unsewn portions between the inner end portions 11, 11 of the oblique free end edges 9, 9 and the mid-points 10, 10, as in the former embodiment. The cut-outs 12, 12 are formed by cutting off the corresponding portions along the edges. With the shown construction, the problem of extending the inner end portions 11, 11 Of the oblique end edges 9, 9 inwardly during expansion of the bellows, can be successfully and completely eliminated.

Figure 8:
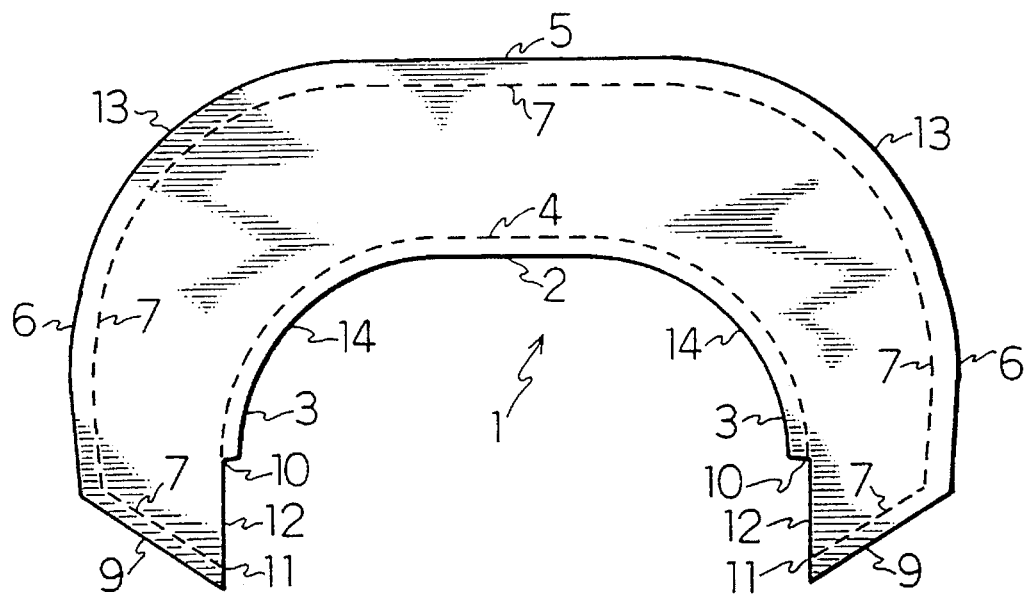
FIG. 8 is a front elevation of the third embodiment of a three-side covering, seam-type bellows according to the present invention, in no-load condition.

FIG. 8 is a front elevation of the third embodiment of the bellows according to the invention, in which the bellows is illustrated in the no-load condition. The shown embodiment of the bellows is provided with arc portions with arcuate outer edges 13, 13. The arced outer edges 13, 13, of the arcuate portions are arranged between the major portion and the both side extensions. With the shown construction, the outer intermediate portion will not contact with the externally arranged member which otherwise causes contact resulting in retriction. It should be appreciated, the shown embodiment of FIG. 8, the outer edges 5 of the major portion and the outer edges 6, 6 are connected via respective arcuate outer edges 13, 13. Similarly, the inner edge 2 is connected with the inner edges 3, 3 via the arced inner edges 14, 14 of the arced portions. By interpositioning of the arcuate outer edges 13, 13, the narrow width portions of the shaped sheet 1 of the reduced width, can be reinforced.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments within a scope encompassed and equivalents thereof with respect to the feature set out in the appended claims.

In the three-side covering seam-type bellows, the unsewn portions are inherently required for permitting expansion of the bellows by opening. In this context, since the conventional bellows of the type in equation is provided at the substantially horizontal lower end edge of respective shaped sheet, the dust in the external environment can easily penetrate into the interior space of the bellows. In contrast to this, according to the present invention, since the portions to be opened i.e. the unsewn portions, are arranged vertically at the inside of the bellows, penetration of the dust other debris can be minimized.

Furthermore, concerning compensative displacement associated with opening of the open section, the conventional bellows employs the construction inwardly displacing the skirt portion of both outer edges, fan action may be taken place to easily permit penetration of the dust and so forth through the openings. In contrast to this, since the present invention is provided with the oblique free end edges descending from the outside to the inside, the oblique free end edges are closed by the corresponding portions of the outer sewing line, and the unsewn portions to be opened are formed to extend vertically in the inside of the bellows, even when the pulling up action for the inner end portions of the oblique free end edges is caused, debris can not be forced into the interior space of the bellows. In addition, according to the present invention, the inward displacement of both outer edges in response to the pulling up action of the inner end portions of the oblique free end edges, can be minimized in the displacement magnitude. As an integral benifit of the present invention, the bellows does not induce sucking debris into the interior space of the bellows.

Furthermore, as in the second and third embodiments, the cut-outs formed on the inner edges are successful in preventing the inner edge from protruding inwardly during expansion of the bellows. Accordingly, the bellows can be made more compact in the extent of the marginal space which is otherwise required for avoiding interference between the bellows and the member to be covered.

Also, as in the third embodiment, by chamfering the corner by means of the arcuate portions, interference between the bellows and the external member can be minimized.

What is claimed is:

1. A bellows comprising:

a plurality of sheets of mutually identical configuration of the same size, each of said sheets has an upper portion and a pair of side portions extending downward from both ends of said upper portions, said sheets being adjacently ajoined for forming the bellows;

a pair of oblique edges provided in downward slopes to inner sides from outer sides on a pair of lower edges of said side portions;

an outer sewing line provided along outer edges of first adjacent sheets for interconnection therebetween, said outer sewing line extending to the inner sides on said pair of oblique edges;

an inner sewing line provided along inner edges of second adjacent sheets for interconnection therebetween, said inner serving line being terminated at a pair of middle points on the inner edges in the pair of side portions; and a pair of unsewn portions formed between said pair of inner sides on the pair of oblique edges and said pair of middle points.

2. A bellows as set forth in claim 1, wherein a pair of notches are provided at said inner edges on said pair of unsewn portions.

3. A bellows as set forth in claim 1, wherein a pair of arcuate edges are disposed between an outer edge of said upper portion and outer edges of said pair of side portions.

* * * * *

UNITED STATES PATENT AND TRADEMARK OFFICE
CERTIFICATE OF CORRECTION

PATENT NO. : 5,558,951
DATED : September 24, 1996
INVENTOR(S) : Takeshi Nemoto and Teruko Nemoto It is certified that error appears in the above-indentified patent and that said Letters Patent is hereby corrected as shown below:

Column 2, Line 25 "unsewn E portion" should be -- unsewn portion --

Column 5, Line 65 "retriction" should be --restriction --

Column 6, Line 2 "arced" should be -- arcuate --

Column 6, Line 3 "arced" should be -- arcuate --

Column 6, Line 64 "ajoined" should be -- adjoined --

Column 7, Line 9 "serving" should be -- sewing --

Signed and Sealed this

Eleventh Day of February, 1997

Attest:

BRUCE LEHMAN

*Attesting Officer*  *Commissioner of Patents and Trademarks*